United States Patent
Yokoi et al.

(10) Patent No.: US 7,528,378 B2
(45) Date of Patent: May 5, 2009

(54) RADIATION DETECTION APPARATUS AND RADIOLOGICAL IMAGING APPARATUS

(75) Inventors: Kazuma Yokoi, Hitachi (JP); Hiroshi Kitaguchi, Naka (JP); Katsutoshi Tsuchiya, Hitachi (JP); Takafumi Ishitsu, Hitachi (JP); Kensuke Amemiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/714,216

(22) Filed: Mar. 6, 2007

(65) Prior Publication Data
US 2007/0176110 A1  Aug. 2, 2007

Related U.S. Application Data

(63) Continuation of application No. 11/032,091, filed on Jan. 11, 2005, now Pat. No. 7,202,482.

(30) Foreign Application Priority Data
Jan. 13, 2004  (JP) ............................. 2004-005130

(51) Int. Cl.
*H01L 27/146* (2006.01)
(52) U.S. Cl. ............................ 250/370.09; 250/370.01; 250/370.14
(58) Field of Classification Search ............ 250/370.09, 250/370.01, 370.14, 370.1
See application file for complete search history.

(56) References Cited

U.S. PATENT DOCUMENTS

| 4,727,256 | A | 2/1988 | Kumazawa |
| 6,236,051 | B1* | 5/2001 | Yamakawa et al. ........ 250/370.1 |
| 6,359,281 | B1* | 3/2002 | Pawlak et al. .......... 250/370.09 |
| 6,465,790 | B1* | 10/2002 | Monnet et al. ......... 250/370.09 |
| 6,990,176 | B2* | 1/2006 | Sherman et al. ............ 378/98.8 |
| 7,202,482 | B2* | 4/2007 | Yokoi et al. ............ 250/370.09 |
| 7,235,788 | B2* | 6/2007 | Von der Haar ......... 250/370.09 |
| 2002/0130266 | A1 | 9/2002 | Kyyhkynen |
| 2003/0085359 | A1* | 5/2003 | Dailey et al. ........... 250/370.15 |

FOREIGN PATENT DOCUMENTS

| JP | 7-50428 | 2/1995 |
| JP | 2000-241555 | 9/2000 |

\* cited by examiner

*Primary Examiner*—David P Porta
*Assistant Examiner*—Jessica L Eley
(74) *Attorney, Agent, or Firm*—Dickstein Shapiro LLP

(57) ABSTRACT

A radiological imaging apparatus comprising a semiconductor detector unit in which a plurality of semiconductor radiation detection elements are installed on a detector mounted substrate in a matrix to constitute a detector unit. A plurality of detector units are releasably mounted on a fixing substrate. This mounting is carried out mating a coupling screw with a threaded hole formed in the detector mounted substrate, the coupling screw being inserted through a through-hole formed in the fixing substrate. The detector mounted substrate is provided with a pair of positioning pins. The positioning pins are inserted into positioning holes, respectively, formed in the fixing substrate, to position the detector unit.

15 Claims, 9 Drawing Sheets

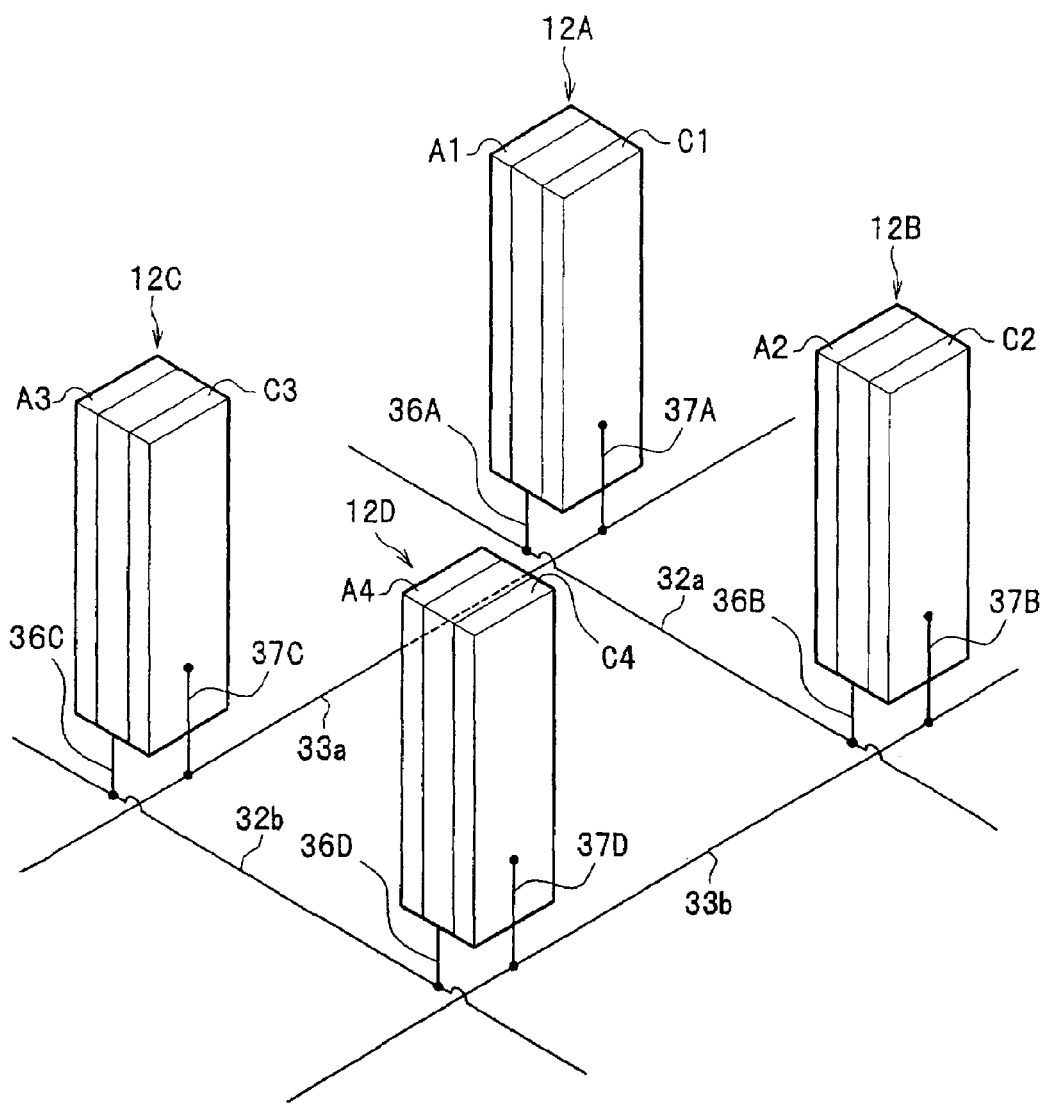

RADIATION DETECTION APPARATUS AND RADIOLOGICAL IMAGING APPARATUS

The present application is a continuation of U.S. patent application Ser. No. 11/032,091, filed Jan. 11, 2005, now U.S. Pat. No. 7,202,482 which claims foreign priority under 35 U.S.C. § 119 to Japanese Patent Application No. 2004-005130, filed Jan. 13, 2004, wherein the entire content of each of the foregoing applications is incorporated herein by reference.

BACKGROUND OF THE INVENTION

The present invention relates to a radiation detection apparatus and a radiological imaging apparatus, and in particular, to radiation detection apparatus in which semiconductor radiation detection elements can be replaced with new ones, and a radiological imaging apparatus such as a single photon emission tomography apparatus (hereinafter referred to as a SPECT apparatus) and a positron emission tomography apparatus (hereinafter referred to as a PET apparatus which uses the radiation detection apparatus.

Conventional radiation detectors detecting radiation such as a γ ray are known to use an NaI scintillator (JP-A-2000-241555 (paragraph 0019, FIG. 1)). In a gamma camera (a kind of radiological imaging apparatus) comprising an NaI scintillator, radiation (γ ray) is incident on the scintillator at an angle limited by a large number of collimators. The radiation thus interacts with an NaI crystal to emit scintillation light. The light reaches a photomultiplier via a light guide to become an electric signal. A measuring circuit mounted on a measuring circuit fixed board shapes the electric signal and sends it to an external data collecting system from an output connector. The scintillator, light guide, photomultiplier, measuring circuit, measuring circuit fixed board, and the like are wholly housed in a light blocking shield case to block electromagnetic waves other than external radiation.

In general, a gamma camera using a scintillator has a large photomultiplier placed behind a large crystal such as NaI. Accordingly, a positional resolution is limited to the order of several to over 10 mm. Further, the scintillator carries out detection through many conversions including one of radiation into visible light and one of visible light into electrons. Consequently, the scintillator disadvantageously has a low energy resolution and cannot resolve entering scattered radiation. This results in a decrease in S/N ratio for a signal representative of real positional information on the emission of a γ ray. Accordingly, problems with the scintillator include degraded images or an increase in the time required for imaging. Some PET apparatuses (Positron Emission Tomography apparatuses) have a positional resolution of 5 to 6 mm and some high-end PET apparatuses have a positional resolution of about 4 mm. However, they also have a problem attributed to the S/N ratio.

A radiation detector detecting radiation on the basis of a principle different from that of the scintillator is a semiconductor detector comprising semiconductor radiation detection elements composed of a semiconductor material such as CdTe (cadmium telluride), TlBr (thallium bromide), GaAs (gallium arsenide) (see JP-A-2000-241555 (Paragraph 0019, FIG. 1) and JP-A-7-50428 (Page 2, FIG. 3).

In the semiconductor detector, the semiconductor radiation detection elements convert charges resulting from the interaction between radiation and the semiconductor material, directly into an electric signal. Accordingly, the semiconductor detector can accomplish conversions into electric signals more efficiently than the scintillator and has an excellent energy resolution. Much attention is thus being paid to the semiconductor detector. In this case, the excellent energy resolution means an increase in the S/N ratio of a radiation detection signal indicative of the real position information, that is, an improvement in detection accuracy. Various effects are thus expected such as an improvement in image contrast and a decrease in the time required for image pickup. By two-dimensionally arranging the semiconductor radiation detection elements on a substrate, it is possible to detect the position of an emission source of radiation.

To improve the sensitivity and energy resolution of a semiconductor detector constructed by two-dimensionally arranging semiconductor radiation detection elements, it is necessary to densely arrange the semiconductor radiation detection elements on the substrate so as to minimize dead spaces and capture incident radiation without leakage. However, mounting members or portions must be provided which are used to mount a semiconductor detector in an apparatus, the semiconductor detector having a large area in which a large number of, for example, one hundred thousand semiconductor radiation detection elements are two dimensionally arranged. In this case, dead spaces may be created in order to install the mounting members or portions or areas may be created in which no semiconductor radiation detection elements are arranged. For example, as shown in FIG. 8A, a semiconductor detector 64 is known in which a detector substrate 61 having a large number of semiconductor radiation detection elements 62 two-dimensionally arranged on one surface and a signal reading circuit mounted on the other surface is installed on a circuit board 63 using female connectors 63a fitted around male connectors 61a provided on the detector substrate 61. As shown in the bottom view in FIG. 8B, the semiconductor detector 64 requires a space S1 used to allow mounting jigs such as bolts 65a to be installed at an end of the detector substrate 61 in order to mount each semiconductor detector 64 in a radiation detection section of a radiological imaging apparatus. No semiconductor radiation detection elements can be arranged in the space S1. The presence of the space S1 prevents the improvement of sensitivity of the semiconductor detector 61 based on the dense arrangement of the semiconductor radiation detection elements. Further, in the semiconductor detector 61, shown in FIGS. 8A and 8B, if the radiological detection performance of the semiconductor detector is degraded as a result of failures in or damage to some semiconductor radiation detection elements, the whole semiconductor detector must be replaced with a new one or the defective semiconductor radiation detection elements must be removed and separated from the may other semiconductor radiation detection elements installed. Thus, as shown in the bottom view in FIG. 9, a large semiconductor detector may be constructed by producing substrate units 71a, 71b, 71c, and 71d on which semiconductor radiation detection elements are installed and mounting each of the units 71a, 71b, 71c, and 71d on a fixing substrate (not shown). However, even the semiconductor detector shown in FIG. 9 requires a space S2 used to allow the installation of mounting jigs 72 for mounting each of the units 71a, 71b, 71c, and 71d on the fixing substrate. Consequently, no semiconductor radiation detection elements can be arranged in the space S2, thus preventing the semiconductor radiation detection element from being densely arranged and the improvement of sensitivity and the spatial resolution of the semiconductor detector.

SUMMARY OF THE INVENTION

It is thus an object of the present invention to provide a radiation detection apparatus which can improve the arrangement density of semiconductor radiation detection elements and which can be replaced with a new one as required, as well as a radiological imaging apparatus comprising the radiological detection apparatus.

To accomplish this object, the radiological detection apparatus is characterized in that a detector holding member in which a plurality of semiconductor radiation detection elements are arranged in a matrix and a coupling member that releasably mount a detector unit holding member are positioned in a part of the detector holding member in which no first connector portions are located and in that a positioning device is positioned in a part of the detector unit holding member in which no second connector portions are located.

The radiation detection apparatus can improve the arrangement density of semiconductor radiation detection elements. Further, each detector holding member can be installed on and removed from the detector unit holding member. It is thus possible to replace a detection unit comprising a plurality of semiconductor radiation detection elements and detector holding members.

Further, preferably, the radiological imaging apparatus comprises a radiation detection section configured so that the semiconductor radiation detection elements of the radiation detection apparatus are arranged opposite an emission source of radiation.

In the radiological imaging apparatus, the semiconductor radiation detection elements are densely arranged. This improves the sensitivity and allows the easy replacement of a detector mounted substrate on which defective semiconductor radiation detection elements are installed.

According to the present invention can increase the arrangement density of semiconductor radiation detection elements to improve the sensitivity and thus detection accuracy. Thus, for example, the contrast of images obtained using the radiological imaging apparatus is improved. Therefore, clear images are obtained.

Even if image quality remains unchanged, the effective sensitivity is improved to reduce the time required for image pickup.

Other objects, features and advantages of the invention will become apparent from the following description of the embodiments of the invention taken in conjunction with the accompanying drawings.

BRIEF DESCRIPTION OF THE DRAWINGS

FIG. 5 is a perspective view schematically showing how the semiconductor radiation detection elements are arranged in a matrix on the detector unit shown in FIG. 2 as well as the connections between anode signal lines and cathode signal lines;

DESCRIPTION OF THE EMBODIMENTS

Now, with reference to the drawings as required, a detailed description will be given of preferred embodiments of a radiation detection apparatus according to the present invention and a radiological imaging apparatus using the radiation detection apparatus. In the description below, description will be given of the embodiments as well as a semiconductor radiation detector, an integrated circuit, and the like.

Figure 1:
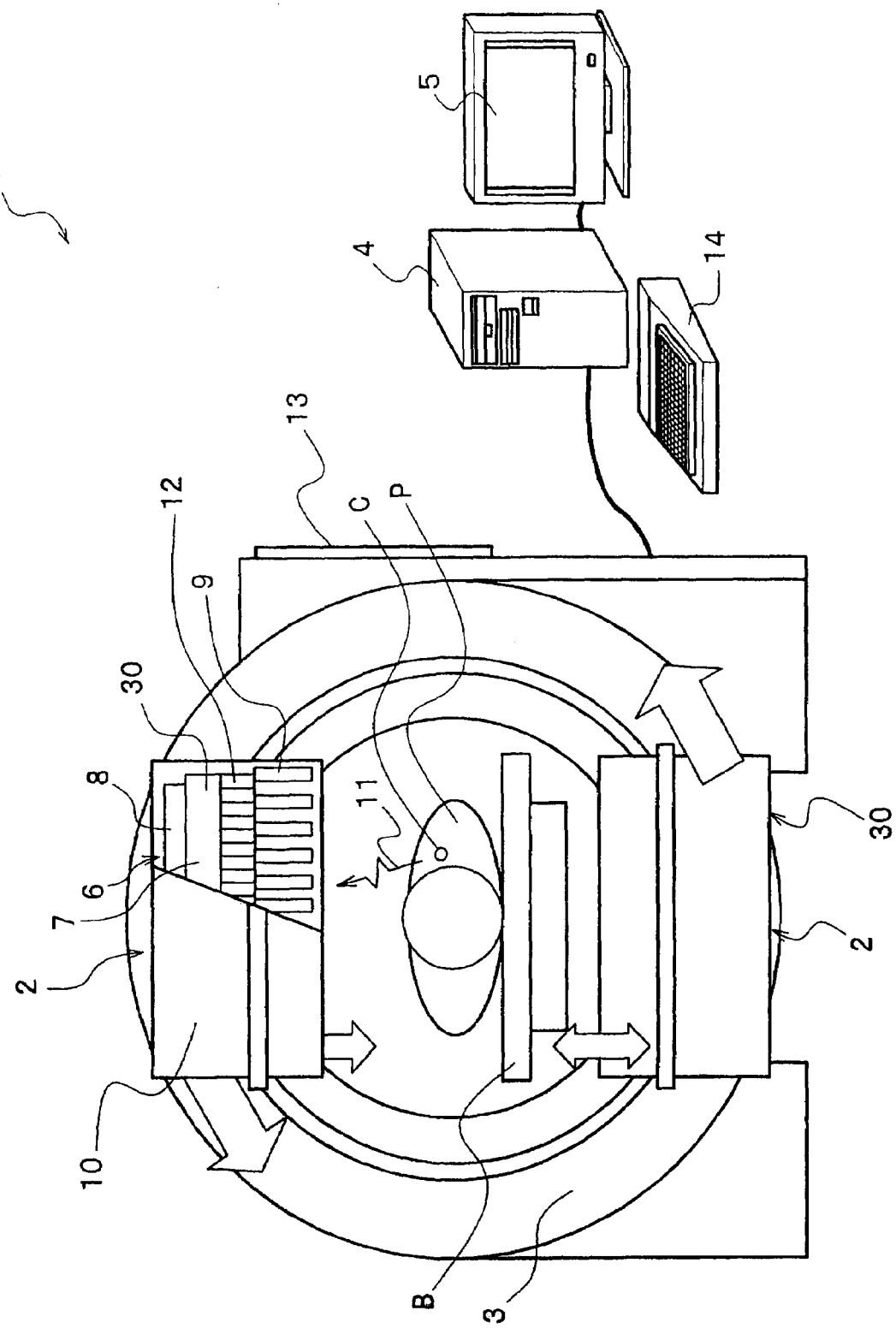
FIG. 1 is a conceptual drawing showing the configuration of a SPECT apparatus operating as a radiological imaging apparatus according to the present invention.
Figure 2:
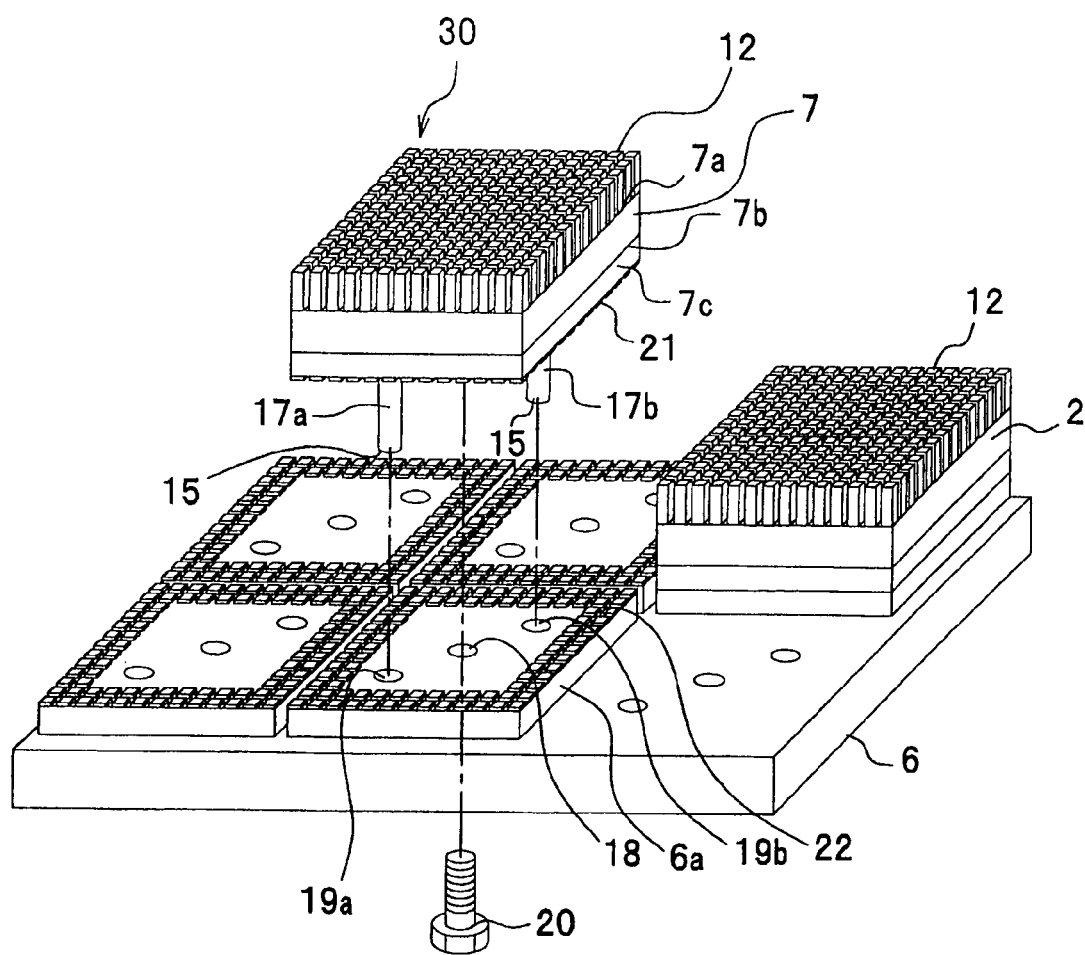
FIG. 2 is a perspective view schematically showing the configuration of a radiation detection apparatus in the SPECT apparatus in FIG. 1.
Figure 3:
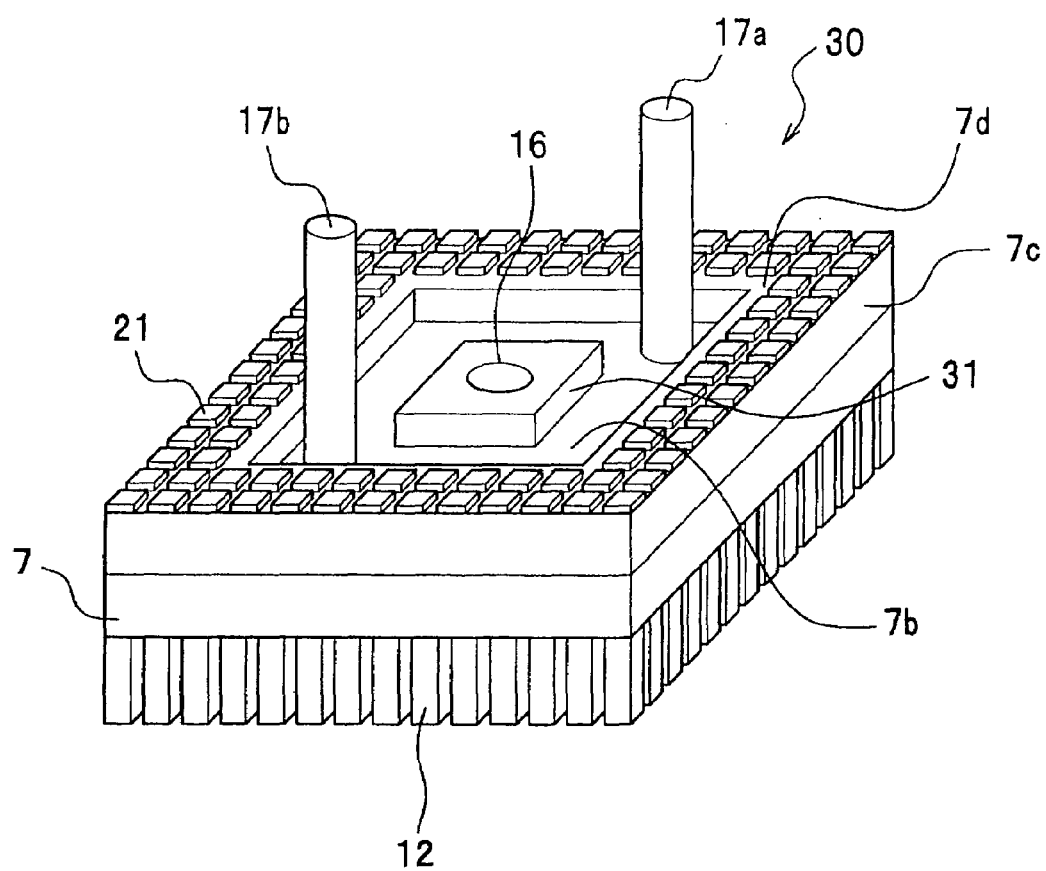
FIG. 3 is a perspective view of a detector unit shown in FIG. 2 as viewed from output pins.
Figure 4A:
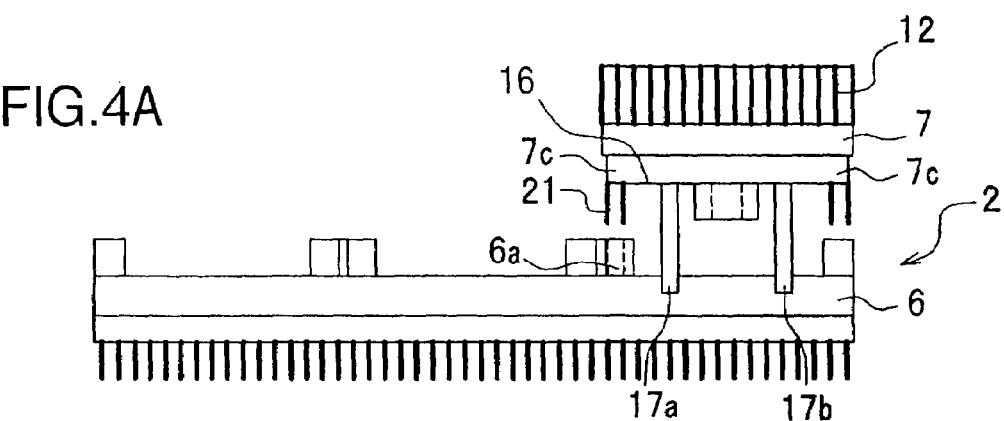
FIGS. 4A and 4B are diagrams schematically showing the arrangement structure of semiconductor radiation detection elements and the connections between anode signal lines and cathode signal lines.
Figure 4B:
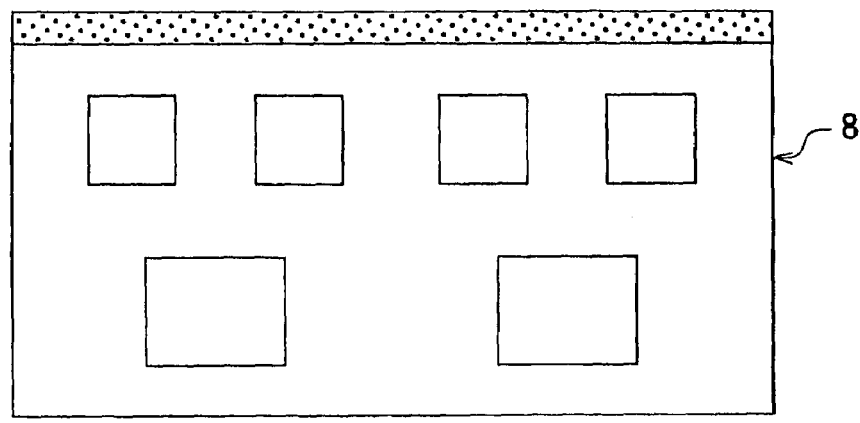
Figure 4C:
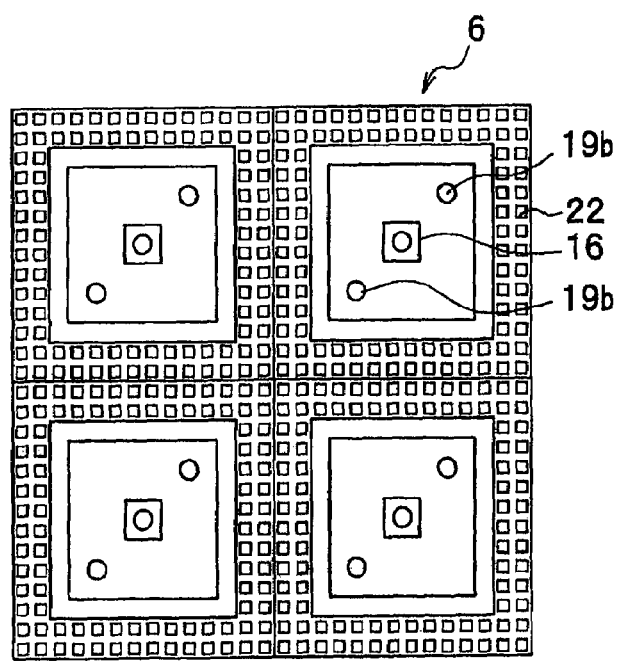
FIG. 4C is a bottom view of a detector unit.

With reference to FIG. 1, description will be given of a SPECT (Single Photon Emission Computer Tomography) Apparatus 1 according to an embodiment of a radiological imaging apparatus according to the present invention.

The SPECT apparatus 1 comprises a pair of radiation detection apparatuses 2, 2, a rotating support member 3, a data collection and analysis device 4, and a display device 5. The radiation detection apparatuses 2, 2 are installed on the rotating support member (rotating device) 3 at different positions separated by 180 or 90°. Each of the radiation detection apparatuses 2, 2 rotates independently and enables a radiation incident angle to be varied. The radiation detection apparatuses 2, 2 can be arranged side by side to increase an image pickup area or can be used as gamma cameras for planar imaging. Each of the radiation detection apparatuses 2, 2 comprises a fixing substrate 6, a plurality of detector units 30, and a measurement circuit unit (signal processing device) 8. Each of the detector units 30 has a large number of semiconductor radiation detection elements (semiconductor radiation detectors) 12 arranged on a detector mounted substrate (detector holding member) 7 in lattice form. A plurality of detector mounted substrates 7 are installed on a surface of the fixing substrate (detector unit holding member) 6 which corresponds to the inside of the rotating support member 3, that is, to a bed B. The measurement circuit unit 8, on which an integrated circuit is installed, is placed on the opposite sides of the fixing substrates 6. A collimator 9 is provided between the radiation detection apparatus 2, 2 and the bed B; the collimator 9 is formed of a radiation shielding material (for example, lead or tungsten) and has a large number of through-holes. The collimator 9 limits a view angle from the radiation detection apparatus 2. Further, in each radiation detection apparatus 2, the collimator 9, the measurement circuit unit 8, and the detector units 30 are housed inside a light and electromagnetic-wave blocking shield 10 to block the effect of electromagnetic waves other than a γ ray 11 emitted by a subject P. The light and electromagnetic-wave blocking shield 10 is formed of a material such as aluminum or an aluminum alloy which has a light blocking property.

In the SPECT apparatus 1, the bed B is moved on which the subject P to which a radiopharmaceutical has been administered lies. The subject P is moved between the paired radiation detection apparatus 2 and 2. The subject's body emits a γ ray emitted from the radioactive agent.

The γ ray 11 emitted from a concentrated site (for example, a cancerous site) CD at which the radiopharmaceutical is concentrated is incident on the semiconductor radiation detection elements 12 of the radiation detection apparatus 2 through the through-holes in the collimator 9. The measurement circuit unit 8 processes γ ray detection signals output by the semiconductor radiation detection elements 12. The measurement circuit unit 8 comprises the integrated circuit (ASIC) that measures data on the peak value of the γ ray for each γ ray detection signal that is an output from the semiconductor radiation detection element 12. The measurement circuit unit 8 thus measures the peak value of the radiation (γ ray) detected. The collection and analysis device (data processing device) 4 has a storage device, tomogram information creation device (not shown), and the like.

Rotation of the rotating support member 3 causes the radiation detection apparatuses 2, 2 to pivot around the subject P. During the pivoting, the radiation detection apparatuses 2, 2 output γ ray detection signals. The following control may be performed near the SPECT apparatus 1 using an operation panel 13 or at a long distance from the apparatus 1 using a data input device 14: the rotational control of the rotating support member 3, the control of the distance between the radiation detection apparatus 2, 2 and the subject P, and the positional control of the subject P using the bed B.

Now, the radiation detection apparatus 2 used in the present embodiment will be described with reference to FIGS. 2 to 4A to 4C. In FIGS. 2 and 4A to 4C, for the convenience of description, γ rays are incident from the top of the sheet of each drawing. The illustration of the collimator 9, installed on the side of the radiation detection apparatus 2 on which γ rays are incident, is omitted.

The radiation detection apparatus 2 comprises the plurality of detector units 30 and the fixing substrate 6, on which the detector units 30 are installed. The detector mounted substrate 7 of each detector unit 30 is releasably mounted on the fixing substrate 6. Each detector mounted substrate 7 comprises a surface 7a on which the semiconductor radiation detection elements 12 are installed, a threaded hole 16 opened in a surface of a support portion 31 (FIG. 3) projected from a surface of the detector mounted substrate 7b which is opposite the surface 7a, and positioning pins 17a and 17b projected from the surface 7b. The support portion 31 projects from an end surface 7d (FIG. 3) of a first connector 7c described later. For example, 8×8 semiconductor radiation detection elements 12 are normally mounted on the detector mounted substrate 7 in a matrix. The fixing substrate 6 comprises a through-hole (coupling member insertion hole) 18 formed in its central part and a positioning holes 19a and 19b into which the positioning pins 17a and 17b, respectively, of the detector mounted substrate 7 are fittingly and releasably inserted. With the plurality of semiconductor radiation detection elements 12 mounted, the positioning pins 17a and 17b of the detector mounted substrate 7 are inserted into the positioning holes 19a and 19b, respectively, of the fixing substrate 6. The positioning pin 17a and the positioning hole 19a constitute one positioning device. The positioning pin 17b and the positioning hole 19b constitute the other positioning device. A coupling screw (coupling member) 20 is inserted into the through-hole 18 and is mated with the threaded hole 16. In this manner, the detector mounted substrate 7, that is, the detector unit 30, is mounted at a predetermined position of the fixing substrate 6. At this time, a surface (in which the threaded hole 16 is opened) of the support portion 31 comes into contact with the fixing substrate 6. Then, a force to insert the positioning pins 17a and 17b into the positioning holes 19a and 19b respectively is caused by a force that mates the coupling screw 20 with the threaded hole 16 in the detector mounted substrate 7. To replace the detector unit 30 with a new one, it is possible to loosen the coupling screw 20 out of the threaded hole 16 to remove the detector unit 30 from the fixing substrate 6.

Tip portions 15 of the positioning pins 17a and 17b are formed to penetrate the positioning holes 19a and 19b, respectively, and project from a back surface of the fixing substrate 6. Thus, the tip portions 15 of the positioning pins 17a and 17b, projecting from the back surface of the fixing substrate 6, regulates the motion of the detector mounted substrate 7 when the coupling screw 20 is mated with the threaded hole 16 in the detector mounted substrate 7. This prevents the coupling screw 20 from rotating idly. Further, pulling the tip portions 15 of the positioning members 17a and 17b ensures that the coupling screw 20 and the threaded hole 16 are reliably aligned with each other when the coupling screw 20 starts to be rotated. This enables the coupling screw 20 to be loosened out of the threaded hole 16 with the tips of the positioning pins 17a and 17b held from the back surface of the fixing substrate 6 when the detector unit 30 is removed from the fixing substrate 6 for replacement. On this occasion, by pressing the tip portions 15 of the positioning pins 17a and 17b from the back surface of the fixing substrate 6, it is possible to allow the detector mounted substrate 7 to float from the fixing substrate 6 so as to easily remove the detection unit 30. This is effective in improving the workability of replacement of the detector unit 30. The detector unit 30, mounted on the radiation detection apparatus 2, is replaced with a new one if any of the semiconductor radiation detection elements 12 provided on this detector unit 30 becomes defective.

Each detector mounted substrate 7 has the first connector 7c mounted on its surface opposite to the surface 7a, on which the plurality of semiconductor radiation detection elements 12 are installed. The first connector 7c extends along the four sides of the detector mounted substrate 7 so as to surround the positioning pins 17a and 17b and support portion 31. Thus, in a central portion of the detector mounted substrate 7, the support portion 31 and the positioning pins 17a and 17b are installed and an area (surface b) is formed in which no connectors or the like are present. A plurality of output pins 21 are projected from the first connector (first connector portion) 7c. Those of the plurality of output pins 21 which are each connected to one end of a corresponding one of a plurality of anode signal lines (described later) are called first connector terminals. The remaining plural output pins 21 are each connected to one end of a corresponding one of a plurality of cathode signal lines described later. These output pins 21 are called second connector terminals. When the above detector unit 30 is installed on the fixing substrate 6, these output pins 21 are fitted into respective input terminal connectors 22 of a second connector (second connector portion) 6a provided on the fixing substrate 6. Those of the plurality of input terminal connectors 22 into which the first connector terminals are fitted are called third connector terminals. The second connector terminals are fitted into the remaining plural input terminal connectors 22, which are called fourth connector terminals. The second connector 6a is mounted on the fixing substrate 6 in regular ring form so as to surround the through-hole 18 and positioning holes 19a and 19b, which are provided in association with one detector unit 30. Each of the output pins 21 is connected to a corresponding one of the plurality of anode signal lines 32a, 32b, . . . and a corresponding one of the plurality of cathode signal lines 33a, 33b, . . .

Each of the semiconductor radiation detection elements 12, installed on each detector mounted substrate 7, has a thin plate-like semiconductor area (semiconductor portion) 23 that interacts with radiation to generate charges, and an anode A and a cathode C located opposite each other across the semiconductor area 23, as shown in FIG. 5. The anode A and the cathode C are installed in the semiconductor area 23. The semiconductor area 23 is composed of any single-crystal semiconductor material such as CdTe (cadmium telluride), TlBr (thallium bromide), or GaAs (gallium arsenide). The electrodes (anode A and cathode C) are composed of any of Pt (platinum), Au (gold), In (indium), or the like. In the description below, the semiconductor area 23 is obtained by slicing a single crystal of CdTe. The semiconductor area 23 has a thickness (between a surface of the semiconductor area 23 on which the anode electrode A is mounted and its surface on which the cathode electrode C is mounted) of 0.2 to 2 mm (more preferably, 0.5 to 1.5 mm). Radiation to be detected is a γ ray with predetermined energy used by the SPECT apparatus. The anode electrode A and the cathode electrode C are formed on the surfaces of the semiconductor area 23 by deposition or other method. The anode electrode A and cathode electrode C, which are formed like films, have a film thickness of about several hundred nanometers. The anode electrode A and the cathode electrode C are connected together using a conductive plate of about 20 to 80 microns.

As previously described, the plurality of semiconductor radiation detection elements 12 are installed on each detector mounted substrate 7 in a matrix. Some (semiconductor radiation detection elements 12A, 12B, 12C, and 12D) of the plurality of semiconductor radiation detection elements 12, arranged in a matrix, are assumed to be placed, for example, as shown in FIG. 5. The semiconductor radiation detection elements 12 are installed on the detector mounted substrate 7 so that the semiconductor areas 23 and the anodes and cathodes, installed in the semiconductor areas 23, cross the detector mounted substrate 7, more specifically, are orthogonal to it. Anodes A1 and A2 of the semiconductor radiation detection elements 12A and 12B arranged in a line in a direction a are connected to an anode signal line 32a extending in the direction a, using signal lines 36A and 36B. Anodes A3 and A4 of the semiconductor radiation detection elements 12C and 12D arranged in a line in the direction a are connected to an anode signal line 32b extending in the direction a, using signal lines 36C and 36D. Further, cathodes C1 and C3 of the semiconductor radiation detection elements 12A and 12C arranged in a line in a direction b crossing the direction a are connected to a cathode signal line 33a extending in the direction a, using signal lines 37A and 37C. Cathodes C2 and C4 of the semiconductor radiation detection elements 12B and 12D arranged in a line in a direction b are connected to a cathode signal line 33b extending in the direction b, using signal lines 37B and 37D. In this manner, each anode signal line extending in the direction a connects to the anodes of the plurality of semiconductor radiation detection elements 12 arranged in a line. Each cathode signal line extending in the direction b connects to the cathodes of the plurality of semiconductor radiation detection elements 12 arranged in a line. The separate output pins 21 connect to one end of each of the plurality of anode signal lines 32a, 32b, . . . and one end of each of the plurality of cathode signal lines 33a, 33b, . . . The signal lines are installed on the surface 7a of the detector mounted substrate 7 or inside it. If the semiconductor radiation detection element 12 can be configured to have a small thickness of about 0.5 to 1.5 mm, it is possible to densely arrange alone semiconductor radiation detection elements 12 each having one semiconductor area 23. This is effective in improving the sensitivity.

Now, the operation of the radiation detection apparatus 2 will be described.

First, description will be given in brief of the principle of detection of a γ ray by the semiconductor radiation detection element 12. When a γ ray is incident on the semiconductor radiation detection element 12 and interacts with the semiconductor area 23, an amount of hole and electron pairs are generated in proportion to the energy of the γ ray. In this case, a charge collecting voltage from a high voltage power source is applied to between the anode A and cathode C of the semiconductor radiation detection element 12. Thus, the holes are attracted and moved to the cathode C, while the electrons are attracted and moved to the anode A.

In FIG. 5, it is assumed that a γ ray is incident and interacts with the semiconductor area 23 of the semiconductor radiation detection element 12A. Then, charge information is obtained from the anode signal line 32a, to which the anode A1 is connected, and the cathode signal line 33a, to which the cathode C1 is connected. By carrying out a matrix read in which signals from the anode signal line 32a and cathode signal line 33a are simultaneously determined and superimposed on each other, it is possible to detect which of the semiconductor radiation detection elements 12 the γ ray has entered. This simultaneous determination is performed in the integrated circuit of the measurement circuit unit 8. This simultaneous determination makes it possible to sharply reduce the number of signal lines used to read positions. The decrease in the number of signal lines leads to the creation of available free spaces. The anode signal lines 32a, 32b, . . . and the cathode signal lines 33a, 33b, . . . are individually connected to the respective output pins 21 (see FIG. 2) of the detector mounted substrate 7. The charge information resulting from the incidence of the γ ray is input to the integrated circuit (ASIC) of the measurement circuit unit 8 through the output pins 21 connected to the signal lines via the input terminal connectors 22 of the fixing substrate 6. The integrated circuit comprises an analog integrated circuit that processes signals output by the semiconductor radiation detection elements 12, an AD converter that convert an analog signal output by the analog integrated circuit into a digital signal, and a digital integrated circuit that processes the signal subjected to the AD conversion. The integrated circuit thus outputs peak value information on the radiation (γ ray) detected by a certain semiconductor radiation detection element 12, to the data collection and analysis device 4.

A rotation angle detected by an angle gauge (not shown) connected to a rotating shaft of a motor (not shown) that rotates the rotating support member 3 is input to the data collection and analysis device 4. The rotation angle corresponds to each radiation detection apparatus 2. On the basis of the rotation angle, the data collection and analysis device 4 determines the position (positional coordinates) of the semiconductor radiation detection element 12 on the pivoting track of each pivoting radiation detection apparatus 2. On the basis of the position of the semiconductor radiation detection element 12, the data collection and analysis device 4 counts a γ ray for which peak information has a value equal to or larger than a set one (threshold). This counting is executed on areas corresponding to increments of 0.5° with respect to the rotational center of the rotating support member 3. The peak value information is the accumulated value of the peak values of γ ray detection signals from a plurality of semiconductor radiation detection elements located on the extension of a radiation passage in the collimator 9. The data collection and analysis device 4 uses the positional information on the semiconductor radiation detection element 12 and the count information on γ rays (counting information) both obtained when the γ ray was detected, to create tomogram information on the subject for the position at which the radiopharmaceutical is concentrated, that is, the position of a malignant tumor. The tomogram information is displayed on the display device 5. Further, a storage device of the data collection and analysis device 4 stores this packet information, the count value and positional information on the semiconductor radiation detection element 12 obtained through the simultaneous measurement, the tomogram information, and the like.

Thus, even with a semiconductor detection unit having individually arranged elements, matrix reading sharply reduced the number of required circuits by a factor of 2/n compared to the case in which information is individually read from n×n pixels. This results in the creation of available free spaces.

In the embodiment configured as described above, the coupling screw 20 mates with the threaded hole 16 through the through-hole 18, formed in a part of the fixing substrate 7 in which the second connector 6c is not located, the threaded hole 16 being formed in a part of the detector mounted substrate 7 in which the first connector 7 is not located and which is opposite the fixing substrate 6. Consequently, no coupling members such as the coupling screw 20 are arranged between the adjacent detector units 30. Thus, the detector unit 30 having the large number of semiconductor radiation detection elements 12 can be tightly installed on the fixing substrate 6. Therefore, the semiconductor radiation detection elements 12 can be densely arranged all over the surface of the fixing substrate 6 or the surface of the radiation detection apparatus 2 in which a plurality of fixing substrates 6 are arranged. This improves the sensitivity of detection of γ rays, the uniformity of the sensitivity, and the spatial resolution. It is thus possible to improve the detection sensitivity of the whole radiological imaging apparatus (SPECT) to reduce the time required for image pickup. Each detector mounted substrate 7 can be easily removed from the fixing substrate 6 by loosening the coupling screw 20 out of the threaded hole 16 while holding the tips of the positioning pins 17a and 17b from the back surface of the fixing substrate 6, to allow the detector mounted substrate 7 to float from the fixing substrate 6. Thus, if any semiconductor radiation detection elements become defective or are damaged, the detector mounted substrate 7 can be easily replaced with a new one. Further, it is only necessary to replace the detector mounted substrate 7 on which the defective or damaged semiconductor radiation detection elements are mounted. This serves to reduce useless operations for maintenance (that is, reduce costs). Moreover, the positioning pins 17a and 17b can be used to accurately install the detector mounted substrate 7 at a predetermined position of the fixing substrate 6. This enables mounting operations to be accurately and easily performed. Since the positioning pins 17a and 17b are inserted into the positioning holes 19a and 19b, respectively, the detector mounted substrate 7 is prevented from rotating together with the coupling screw 20 when the coupling screw 20 is mated with the threaded hole 16.

In the present embodiment, the support portion 31 is provided on the detector mounted substrate 7. Accordingly, when the detector unit 30 is mounted on the fixing substrate 6, the weight of the large number of semiconductor radiation detection elements 12 and detector mounted substrate 7 is transmitted to the fixing substrate 6 via the support portion 31. This prevents the exertion of an excessive force on the connector portion of the output pin 21 and input terminal connector 22 fitted together. This in turn avoids damage to the connector portion. Furthermore, since the support portion 31 is located at the central axis of the detector unit 30, it is possible to safely support a large number of semiconductor radiation detection elements 12 and detector mounted substrates 6 or the like.

In the present embodiment, the first connector 7c is located in the peripheral part of the detector mounted substrate 7. However, the first connector 7c may be placed on one surface of the detector mounted substrate 7 and between a diagonal joining two corners of the substrate 7 together and one of the remaining corners. In this case, the support portion 31, having the threaded hole 16, is provided on the same surface of the detector mounted substrate 7 and between the diagonal and the other of the remaining corners. The second connector 6a is placed on the fixing substrate 6 in association with the placement of the first connector 7c.

The detector mounted substrate 7 may be mounted on the fixing substrate 6 without providing the support portion 31, by mating the coupling screw 20 with the threaded hole 18 at a position of the surface b at which the first connector 7c is not located, the threaded hole 18 being formed in the detector mounted substrate 7.

Figure 6:
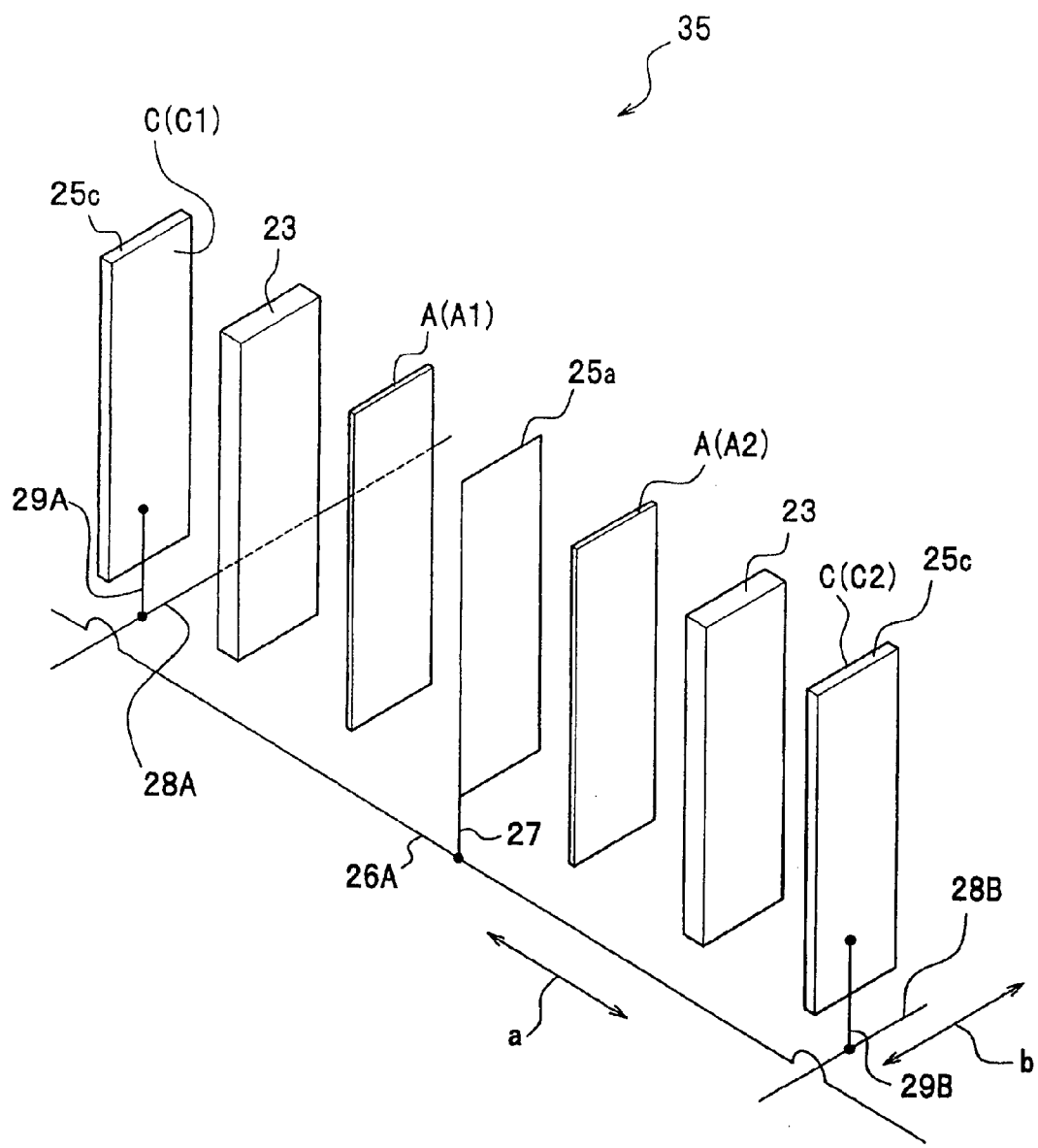
FIG. 6 is a perspective view schematically showing the structure of semiconductor radiation detection elements used in a radiological imaging apparatus that is another embodiment of the present invention, as well as the connections between anode signal lines and cathode signal lines.

Description will be given of another embodiment of a SPECT apparatus according to the present invention. In the SPECT apparatus according to the present embodiment, the structure of semiconductor radiation detection elements used in the detector unit differs from that of the semiconductor radiation detection elements 12 used in the above SPECT apparatus 1. Each semiconductor radiation detection element 35 used in the present embodiment is composed of a combination of two semiconductor radiation detection elements 12. As shown in FIG. 6, the semiconductor radiation detection element 35 has two semiconductor areas 23. The anode A1 and the cathode C1 are mounted on the respective surfaces of one of the semiconductor areas 23. The anode A2 and the cathode C2 are mounted on the respective surfaces of the other semiconductor area 23. The adjacent semiconductor radiation detection elements 12 are laid on top of each other so that the anode A1 stands opposite the anode A2 and that the cathodes C1 and C2 are located on the outside of the semiconductor area. A conductive plate 25a is placed between the anode A1 and the anode A2 so as to be in contact with the anodes A1 and A2. The anodes A1 and A2 are formed like films in planes which sandwich the conductive plate 25a between them and which contact with the respective semiconductor areas. The cathodes C1 and C2 are formed like films on a surface of the conductive plate 25c which is in contact with the semiconductor area 23. This reduces the inter-electrode distance (the distance between the anode A and cathode C) between the semiconductor areas 23 of the two adjacent semiconductor radiation detection elements 12. Advantageously, it is thus possible to appropriately capture charges generated. The semiconductor radiation detection elements 12 are installed on the detector mounted substrate 7 so that the semiconductor areas 23 are substantially perpendicular to the detector mounted substrate 7.

Figure 7:
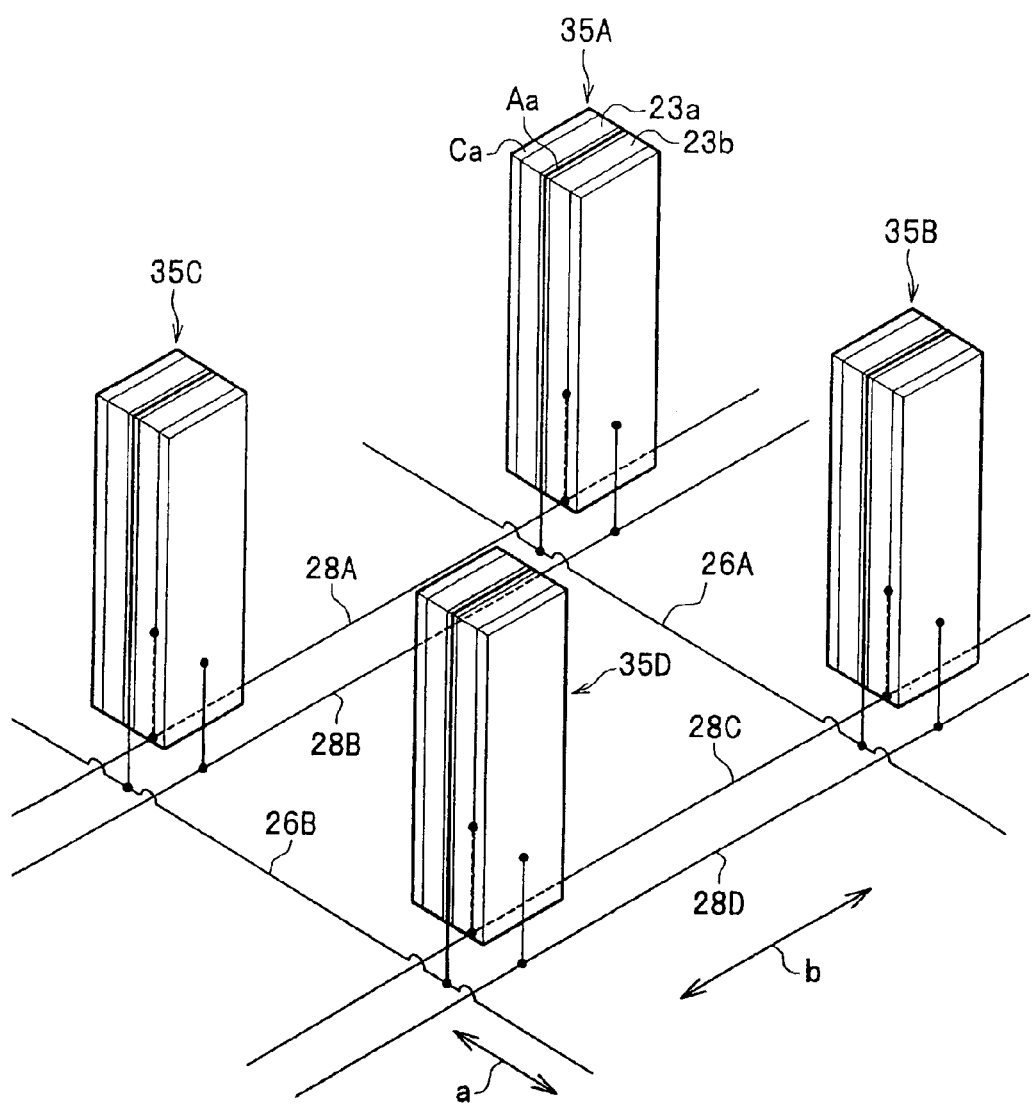
FIG. 7 is a perspective view schematically showing how the semiconductor radiation detection elements shown in FIG. 6 are arranged in a matrix on a detector unit in the radiological imaging apparatus that is another embodiment of the present invention, as well as the connections between anode signal lines and cathode signal lines.
Figure 8A:
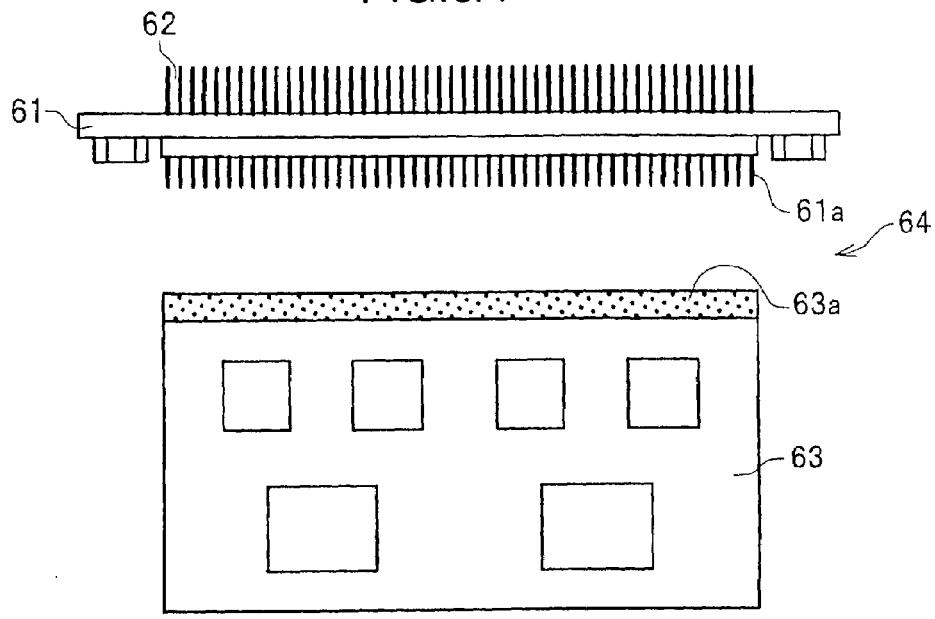
FIG. 8A is a side view schematically showing the configuration of a conventional detector substrate.
Figure 8B:
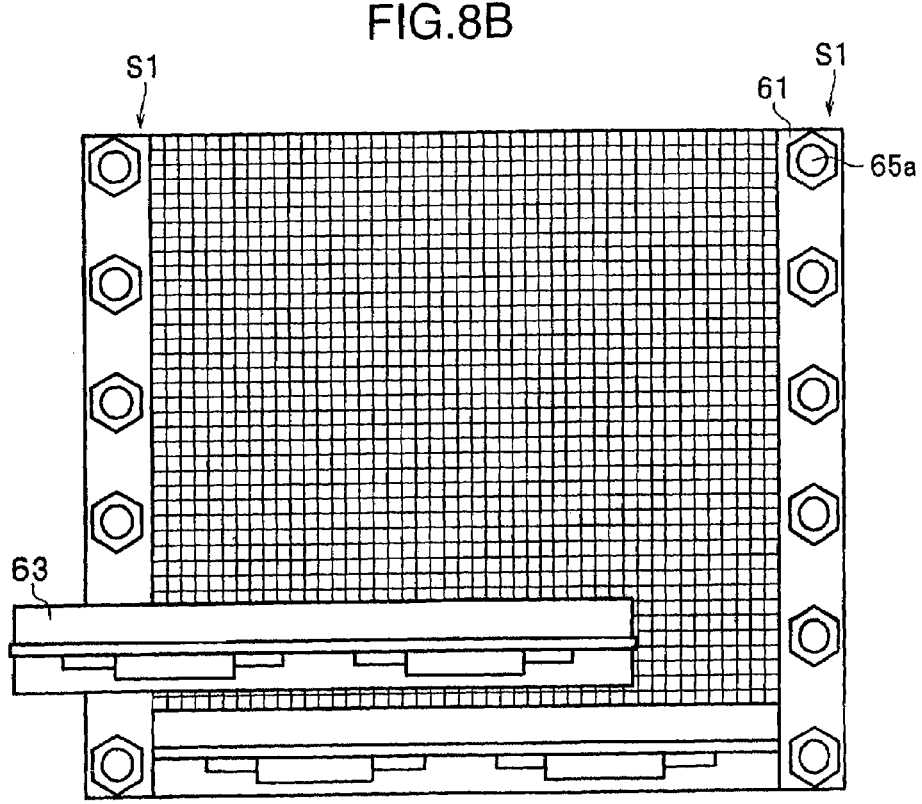
FIG. 8B is a bottom view of the detector substrate.
Figure 9:
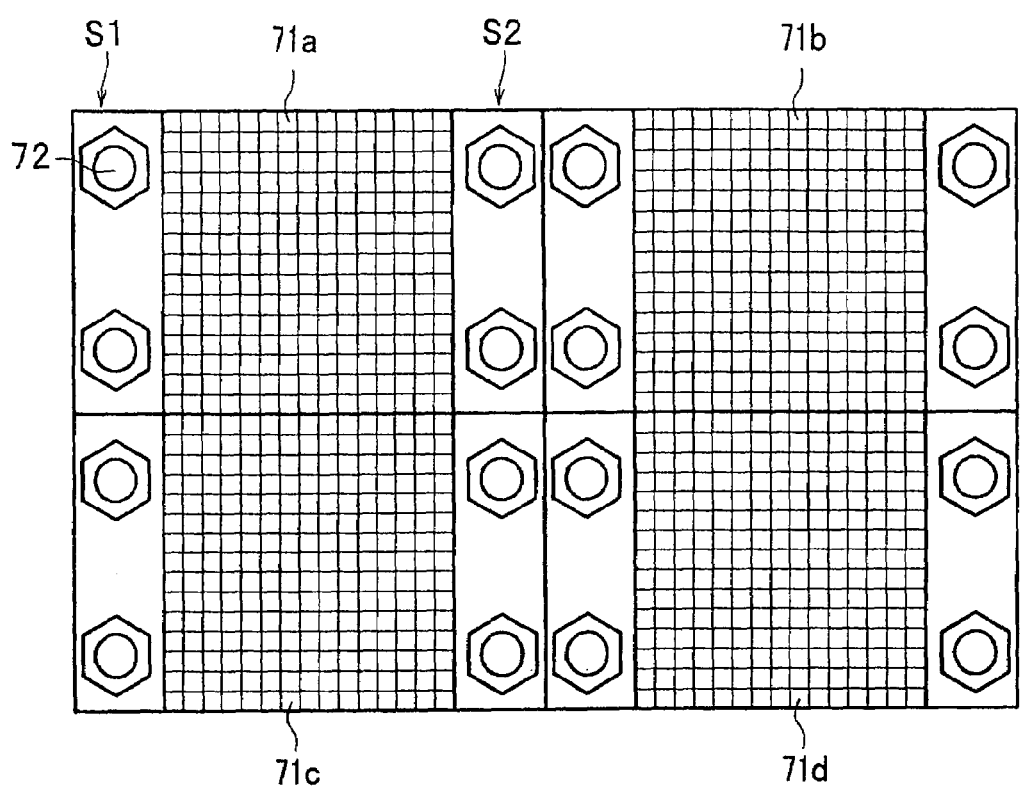
FIG. 9 is a bottom view of a conventional detector unit.

The anodes A of the semiconductor radiation detection elements 35 arranged in a line in the direction a are connected to an anode signal line 26A, one of a plurality of anode signal lines provided in the direction a in FIG. 6, via the conductive plate 25a through a signal line 27. On the other hand, the cathodes C1 of the semiconductor radiation detection elements 35 arranged in a line in the direction b are connected to a cathode signal line 28A extended in the direction b, via a signal line 29A connected to the conductive plate 25b. The other cathodes C2 of the semiconductor radiation detection elements 35 arranged in a line in the direction b are connected to another cathode signal line 28B extended in the direction b, via a signal line 29B connected to the conductive plate 25c. A plurality of anode signal lines 26A and a plurality of cathode signal lines 28A and 28C are arranged on the surface 7a of the detector mounted substrate 7 or inside it along and parallel to the direction a and the direction b, crossing the direction a. The signals lines are further connected together in a matrix so as to connect to the anodes A and cathodes C of the semiconductor radiation detection elements 35a, 35b, 35c, 35d, . . . installed on the detector mounted substrate 7 in a matrix as shown in FIG. 7. In FIG. 7, 26B denotes another anode signal line, and 28C and 28D denote other cathode signal lines.

A charge collecting voltage from a high voltage power source (not shown) is applied (for example, 300 V) between the anode A and cathode C of each semiconductor radiation detection element 12 of the semiconductor radiation detection element 35. Thus, the holes are attracted and moved to the cathode C, while the electrons are attracted and moved to the anode A. In this case, in the configuration shown in FIG. 7, it is assumed that a γ ray is incident and interacts with a semiconductor area 23a of a semiconductor radiation detection element 35a. Then, charge information is obtained from the anode signal line 26A, to which an anode Aa of the semiconductor area 23a is connected, and the cathode signal line 28A, to which a cathode Ca is connected. By carrying out a matrix read in which signals from the anode signal line 26A and cathode signal line 28A are simultaneously determined and superimposed on each other, it is possible to detect which of the semiconductor radiation detection elements 35 the γ ray has entered. One end of each of the anode signal lines 26A, 26B, . . . is connected to a corresponding one of the output pins 21 (see FIG. 2) of the detector mounted substrate 7. One end of a pair of cathode signal lines (for example, the signal lines 28A and 28B) connected to the semiconductor radiation element 35 is connected to another output pin 21. One end of each of the cathode signal lines 28C and 28D is connected to another output pin 21. The charge information resulting from the incidence of the γ ray is input to the integrated circuit (ASIC) of the measurement circuit unit 8 through the output pins 21 connected to the signal lines via the input terminal connectors 22 of the fixing substrate 6. The arrangements of the SPECT apparatus according to the present embodiment other than those described above are similar to those of the SPECT apparatus 1.

The SPECT apparatus according to the present invention produces effects similar to those of the SPECT apparatus 1.

In the above description of the embodiments, the single photon emission computed tomography (SPECT) apparatus is an example of a radiological imaging apparatus. However, the present invention is not limited to the SPECT apparatus but is applicable to a PET apparatus or a γ camera. Both PET apparatus and SPECT apparatus are used to photograph three-dimensional functional images of human bodies. However, in terms of measurements, the SPECT apparatus in principle detects a single photon, and thus cannot carry out simultaneous measurements. The SPECT apparatus thus comprises a collimator that regulates the incident position (angle) of a γ ray. The γ camera provides a two-dimensional functional image and has a collimator for regulating incident angle of a γ ray. In contrast, the PET apparatus can basically simultaneously detect a pair of γ rays emitted in opposite directions separated by 180°, thereby not requiring a collimator.

The radiological imaging apparatus may be composed of a combination of a PET apparatus, a SPECT apparatus, and an X-ray CT.

In the above embodiments, the coupling screw 20 screws into the threaded hole 16 in order to install the detector mounted substrate 7 on the fixing substrate 6. However, the present invention is not limited to this configuration. Any configuration may be used provided that the detector mounted substrate 7 can be installed on the fixing substrate 6 from its back surface utilizing the central area of the detector mounted substrate 7 in which no wires are present. The detector mounted substrate 7 may be mounted on the fixing substrate 6 using, for example, a coupling member that can be inserted into the threaded hole 16 and elastically deformed so as to be locked on an inner peripheral surface of the threaded hole 16. Further, the number of pairs of the positioning pin (17a and 17b) and positioning hole (19b and 19b) is not limited to two. One or many pairs may be used provided that the positioning pins and positioning holes enable the installed position of the detector mounted substrate 7 to be accurately guided. Moreover, the sectional shapes of the positioning pins and holes may be varied so as to more reliably find the installed position. Alternatively, the coupling screw 20 may be attached to the support portion 31 and inserted into the through-hole 18 from a front surface of the fixing substrate 6. A nut may then be mated with the coupling screw 20 from the back surface of the fixing substrate 6 to mount the detector unit 30 on the fixing substrate 6.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radiation detection apparatus comprising:
  a detector unit having a plurality of semiconductor radiation detection elements each having a semiconductor area that interacts with radiation to generate charges and an anode and a cathode constructed opposite each other and across the semiconductor area, and a detector holding member in which the semiconductor radiation detection elements are installed in a matrix including a plurality of rows in a direction a and a plurality of rows in another direction b crossing the direction a; and
  a detector unit holding member in which a plurality of the detector units are installed,
  wherein the detector holding member is provided with a plurality of anode signal lines arranged for every plural row in the direction a and connected to the respective anodes of a plurality of the semiconductor radiation detection elements belonging to the corresponding rows in the direction a and a plurality of cathode signal lines arranged for every plural row in the direction b and connected to the respective cathodes of a plurality of the semiconductor radiation detection elements belonging to the corresponding rows in the direction b,
  the detector holding member is provided with a first connector portion to which the plurality of anode signal lines and the plurality of cathode signal lines are separately connected,
  the detector unit holding member is provided with a second connector portion releasably connected to the first connector portion, and
  the radiation detection apparatus further includes a coupling member that releasably attaches the detector holding member to the detector unit holding member at an opposite portion to the semiconductor radiation detection elements of the detector holding member and at a corresponding position via said detector holding member.

2. A radiation detection apparatus comprising:
  a detector unit having a plurality of semiconductor radiation detection elements each having a semiconductor area that interacts with radiation to generate charges and an anode and a cathode constructed opposite each other and across the semiconductor area, and a detector holding member in which the semiconductor radiation detection elements are installed in a matrix including a plurality of rows in a direction a and a plurality of rows in another direction b crossing the direction a; and a detector unit holding member in which a plurality of the detector units are installed, wherein the detector holding member is provided with a plurality of anode signal lines arranged for every plural row in the direction a and connected to the respective anodes of a plurality of the semiconductor radiation detection elements belonging to the corresponding rows in the direction a and a plurality of cathode signal lines arranged for every plural row in the direction b and connected to the respective cathodes of a plurality of the semiconductor radiation detection elements belonging to the corresponding rows in the direction b, a part of the detector holding member which is opposite the detector unit is provided with a plurality of first connector terminals each connected to one end of a corresponding one of the plurality of anode signal lines and a plurality of second connector terminals each connected to one end of a corresponding one of the plurality of cathode signal lines, a part of the detector unit holding member which is opposite the detector holding member is provided with a plurality of third connector terminals releasably connected to the respective first connector terminals and a plurality of fourth connector terminals releasably connected to the respective second connector terminals, and the radiation detection apparatus further includes a coupling member that releasably attaches the detector holding member to the detector unit holding member at an opposite portion to the semiconductor radiation detection elements of the detector holding member and at a corresponding position via said detector holding member.

3. The radiation detection apparatus according to claim 2, wherein the semiconductor radiation detection elements are installed in the detector holding member so that the semiconductor areas cross a surface on which the detector holding member is installed.

4. The radiation detection apparatus according to claim 2, wherein the coupling member is placed near a central shaft of the detector unit, the first connector portion is placed around the coupling member, and the second connector portion is placed around the coupling member.

5. The radiation detection apparatus according to claim 2, wherein when inserted into a through-hole formed in the detector unit holding member in the part in which the second connector portion is not located, the coupling member couples the detector holding member to the detector unit holding member.

6. The radiation detection apparatus according to claim 2, further comprising a signal processing device that processes output signals output by the semiconductor detection elements via the third connector terminals and the fourth connector terminals.

7. The radiation detection apparatus according to claim 2, wherein a collimator is placed on a side of the semiconductor radiation detection elements on which radiation is incident.

8. A radiation detection apparatus comprising:
a detector unit having a plurality of semiconductor radiation detection elements each having a semiconductor area that interacts with radiation to generate charges and an anode and a cathode constructed opposite each other and across the semiconductor area, and a detector holding member in which the semiconductor radiation detection elements are installed in a matrix including a plurality of rows in a direction a and a plurality of rows in another direction b crossing the direction a; and a detector unit holding member in which a plurality of the detector units are installed, wherein the detector holding member is provided with a plurality of anode signal lines arranged for every plural row in the direction a and connected to the respective anodes of a plurality of the semiconductor radiation detection elements belonging to the corresponding rows in the direction a and a plurality of cathode signal lines arranged for every plural row in the direction b and connected to the respective cathodes of a plurality of the semiconductor radiation detection elements belonging to the corresponding rows in the direction b, a part of the detector holding member which is opposite the detector unit is provided with a plurality of first connector terminals each connected to one end of a corresponding one of the plurality of anode signal lines and a plurality of second connector terminals each connected to one end of a corresponding one of the plurality of cathode signal lines, a part of the detector unit holding member which is opposite the detector holding member is provided with a plurality of third connector terminals releasably connected to the respective first connector terminals and a plurality of fourth connector terminals releasably connected to the respective second connector terminals, and the radiation detection apparatus further includes a coupling member that releasably attaches the detector holding member to the detector unit holding member at an opposite portion to the semiconductor radiation detection elements of the detector holding member; and wherein a support member that contacts partly with the detector unit holding member when the detector unit and the detector unit holding member are coupled together is located in the part in which the first connector portion is not located, and the support member is provided in a part of the detector holding member which is opposite the detector unit.

9. The radiation detection apparatus according to claim 8, wherein the coupling member mates with a threaded hole formed in the support member.

10. The radiation detection apparatus according to claim 8, wherein the coupling member mates with a threaded hole formed in a part of the detector holding member in which the first connector portion is not located and which is opposite the detector unit.

11. A radiological imaging apparatus comprising:
a detector unit having a plurality of semiconductor radiation detection elements each having a semiconductor area that interacts with radiation to generate charges and an anode and a cathode constructed opposite each other and across the semiconductor area, and a detector holding member in which the semiconductor radiation detection elements are installed in a matrix including a plurality of rows in a direction a and a plurality of rows in another direction b crossing the direction a; and a detector unit holding member in which a plurality of the detector units are installed, wherein the detector holding member is provided with a plurality of anode signal lines arranged for every plural row in the direction a and connected to the respective anodes of a plurality of the semiconductor radiation detection elements belonging to the corresponding rows in the direction a and a plurality of cathode signal lines arranged for every plural row in the direction b and connected to the respective cathodes of a plurality of the semiconductor radiation detection elements belonging to the corresponding rows in the direction b, the detector holding member is provided with a first connector portion to which the plurality of anode signal lines and the plurality of cathode signal lines are separately connected, the detector unit holding member is provided with a second connector portion releasably connected to the first connector portion, and the radiological imaging apparatus includes a coupling member that releasably attaches the detector holding member to the detector unit holding member at an opposite portion to the semiconductor radiation detection elements of the detector holding member and at a corresponding position via said detector holding member.

12. A radiological imaging apparatus comprising:

a detector unit having a plurality of semiconductor radiation detection elements each having a semiconductor area that interacts with radiation to generate charges and an anode and a cathode constructed opposite each other and across the semiconductor area, and a detector holding member in which the semiconductor radiation detection elements are installed in a matrix including a plurality of rows ma direction a and a plurality of rows in another direction b crossing the direction a; and a detector unit holding member in which a plurality of the detector units are installed, wherein the detector holding member is provided with a plurality of anode signal lines arranged for every plural row in the direction a and connected to the respective anodes of a plurality of the semiconductor radiation detection elements belonging to the corresponding rows in the direction a and a plurality of cathode signal lines arranged for every plural row in the direction b and connected to the respective cathodes of a plurality of the semiconductor radiation detection elements belonging to the corresponding rows in the direction b, a part of the detector holding member which is opposite the detector unit is provided with a plurality of first connector terminals each connected to one end of a corresponding one of the plurality of anode signal lines and a plurality of second connector terminals each connected to one end of a corresponding one of the plurality of cathode signal lines, a part of the detector unit holding member which is opposite the detector holding member is provided with a plurality of third connector terminals releasably connected to the respective first connector terminals and a plurality of fourth connector terminals releasably connected to the respective second connector terminals, and the radiological imaging apparatus includes a coupling member that releasably attaches the detector holding member to the detector unit holding member at an opposite portion to the semiconductor radiation detection elements of the detector holding member and at a corresponding position via said detector holding member.

13. The radiological imaging apparatus according to claim 12, further comprising an image information creating device that creates image information using information obtained on the basis of output signals output by the semiconductor detection elements via the third connector terminals and the fourth connector terminals.

14. The radiological imaging apparatus according to claim 12, wherein the image information creating device is a tomogram information creating device that creates tomogram information using the information obtained on the basis of the output signals.

15. The radiological imaging apparatus according to claim 12, wherein a radiation detection apparatus includes a collimator having a plurality of radiation passages and placed closer to a bed than the semiconductor radiation detection elements.

* * * * *